United States Patent Office 3,321,482
Patented May 23, 1967

3,321,482
DIAZATRICYCLODODECANES AND THEIR PREPARATION
Leo A. Paquette, Kalamazoo County, Mich., assignor to The Upjohn Company, Kalamazoo, Mich., a corporation of Delaware
No Drawing. Filed July 16, 1962, Ser. No. 210,195
2 Claims. (Cl. 260—293)

This invention relates to novel compositions of matter and to methods for their preparation and is particularly directed to certain diazatricyclododecanes and their preparation.

The novel diazatricyclododecanes of the invention are represented by the following structural formula:

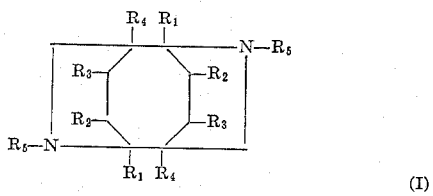

(I)

wherein $R_1$ is selected from the group consisting of hydrogen, methyl, and ethyl; $R_2$ is selected from the group consisting of hydrogen, methyl, and ethyl; $R_3$ is selected from the group consisting of hydrogen, methyl, and ethyl; $R_4$ is selected from the group consisting of hydrogen, methyl, and ethyl; and $R_5$ is the radical

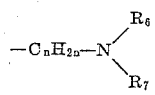

in which $n$ is an integer from 1 to 6, inclusive, and $R_6$ and $R_7$ are selected from the group consisting of loweralkyl and lower-alkyl linked together to form a five to nine membered saturated heterocycle by a member of the group consisting of methylene, sulfur, and oxygen. Examples of lower-alkyl are methyl, ethyl, propyl, butyl, pentyl, hexyl, heptyl, and octyl, and the isomeric forms thereof and examples of saturated heterocycles are piperidino, morpholino, thiamorpholino, piperazino, pyrrolidino, hexamethyleneimino,
heptamethyleneimino,
octamethyleneimino,
homomorpholino,
2-methylhexamethyleneimino,
2,2-dibutylhexamethyleneimino,
3,6-dimethylhexamethyleneimino,
2-ethylmorpholino,
2-ethyl-5-methylmorpholino,
3,3-dimethylmorpholino,
3-methylthiamorpholino,
2,3,5,6-tetramethylthiamorpholino,
2,3,6-trimethylthiamorpholino,
4-butylpiperazino,
4-isopropylpiperazino,
2,2,4,5,5-pentamethylpiperazino,
2,5-diisobutylpiperazino,
2,4,5-trimethylpiperazino,
2-methylpiperidino,
3-methylpiperidino,
4-methylpiperidino,
2-butylpiperidino,
2-propylpiperidino,
4-isopropylpiperidino,
3,4-diethylpiperidino,
2-sec-butylpyrrolidino,
2,2-dimethylpyrrolidino,
2-ethylpyrrolidino,
2,4-dimethylpyrrolidino,
2-isopropylpyrrolidino, and
hexahydro-3-isopropylpyrimidino.

Examples of $—C_nH_{2n}—$ are $—CH_2—$, $—(CH_2)_2—$, $—(CH_2)_3—$, $—(CH_2)_4—$, $—(CH_2)_5—$, $—(CH_2)_6—$, $$—CH_2—CH—, \quad —CH—CH_2—, \quad —CH_2—CH_2—CH—$$
$$\quad\quad\;\; |\quad\quad\quad\quad |\quad\quad\quad\quad\quad\quad\quad\quad |$$
$$\quad\quad CH_3\quad\quad CH_3\quad\quad\quad\quad\quad\quad CH_3$$

$$—CH_2—CH—CH_2—, \quad —CH—CH_2—CH_2—, \quad —CH—$$
$$\quad\quad\quad |\quad\quad\quad\quad\quad\quad |\quad\quad\quad\quad\quad\quad\quad\quad |$$
$$\quad\quad CH_3\quad\quad\quad\quad CH_3\quad\quad\quad\quad\quad\quad CH_3$$

$$—CH—, \quad\text{and}\quad CH_3$$
$$\;\;|\quad\quad\quad\quad\quad\quad\quad |$$
$$CH_2,\quad\quad\quad —C—$$
$$\;\;|\quad\quad\quad\quad\quad\quad\quad |$$
$$CH_3\quad\quad\quad\quad CH_3$$

The novel diazatricyclododecanes of the invention are nitrogenous bases and as such can exist in both the protonated and nonprotonated form according to the pH of the environment. The nonprotonated form can be oxidized, with hydrogen peroxide for example, to form the N-oxide. The N-oxide also can exist in both the protonated and nonprotonated form according to the pH of the environment. The protonated forms can be isolated as acid addition salts which are useful for upgrading the free base and free base N-oxide forms, i.e., the nonprotonated forms. Suitable acids for this purpose are hydrochloric acid, sulfuric acid, phosphoric acid, thiocyanic acid, fluosilicic acid, picric acid, Reinecke's acid, azobenzenesulfonic acid, and the like. The acid addition salt can be formed by neutralizing the free base or free base N-oxide with the appropriate acid or by metathesis of a simple acid addition salt such as the hydrochloride or sulfate with another salt of the desired acid.

The novel diazatricyclododecanes of the invention are useful intermediates. Thus the condensation products obtained from the thiocyanic acid addition salts and formaldehyde according to U.S. Patents 2,425,320 and 2,606,155 are useful as pickling inhibitors, and the fluosilicic acid addition salts are useful as mothproofing agents according to U.S. Patents 1,915,334 and 2,075,359.

The novel compounds of the invention can also exist in the form of quaternary ammonium salts, such for example, as those obtained by coordinating the free base form with a lower-alkyl halide, for example, methyl, ethyl, propyl, butyl, pentyl, hexyl, heptyl, and octyl chloride, including the isomers thereof. The quaternary ammonium salts are useful for forming the corresponding fluosilicic acid salts which are useful as mothproofing agents. These fluosilicic acid salts can be formed by metathesis with an inorganic fluosilicate or by springing the quaternary ammonium hydroxide (by treating the salt with an equivalent of base, e.g., NaOH) and neutralizing it with fluosilicic acid.

The compounds of the invention can be prepared by reducing with lithium aluminum hydride a compound of the following formula:

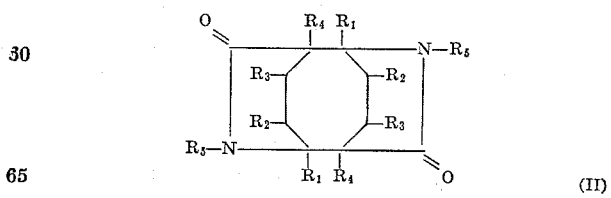

(II)

wherein $R_1$, $R_2$, $R_3$, $R_4$, and $R_5$ are as given above. The latter compounds (Formula II) can be prepared by hydrogenating with hydrogen in an organic solvent, for example, acetic acid or a lower-alkanol in the presence of a catalyst effective to saturate olefinic double bonds, for example, platinum or palladium oxides, a compound having the following structure:

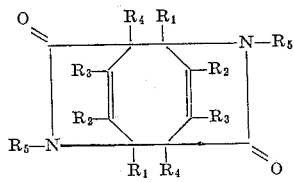

wherein $R_1$, $R_2$, $R_3$, $R_4$, and $R_5$ are as given above.

The intermediates can be prepared by the photodimerization of a 2-pyridone having the formula:

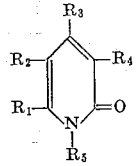

wherein $R_1$, $R_2$, $R_3$, $R_4$, and $R_5$ are as given above. The photodimerization is advantageously effected in aqueous solution at room temperature (24 to 30° C.) because of the ease with which the dimers can be isolated. For the more insoluble 2-pyridones, an organic solvent, for example, ethanol or other lower-alkanol, benzene, toluene, hexane, chloroform, carbon tetrachloride, diethyl ether or other di-lower-alkyl ethers, and the like, can be used. Higher or lower temperatures, say from about 0 to 75 degrees centigrade can be used. The light source can be any ultraviolet lamp, filtered or unfiltered, giving off radiations in the range of about 240 to 260 millimicrons.

The intermediates of Formulas II and III also exist in the protonated and non-protonated forms according to the pH of the environment and form N-oxides on oxidation with hydrogen peroxide which also exist in the protonated or non-protonated forms according to the pH of the environment. The protonated forms can be isolated as acid addition salts, for example with the acids given above, which salts are useful for upgrading the free base or free base N-oxide forms or for forming the corresponding thiocyanate and fluosilicate salt which are useful for forming pickling inhibitors or as mothproofing agents according to the U.S. patents noted above.

The starting compounds IV can be prepared by alkylating 2-pyridone by the procedure of Rath [Ann. 489, 107 (1931)], according to the following equation:

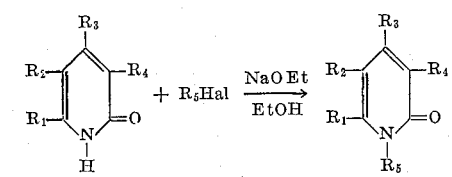

wherein Hal is halogen, e.g., chlorine, bromine, or iodine, and $R_1$, $R_2$, $R_3$, $R_4$, and $R_5$ are as given above. Alternatively they can be prepared by alkylating pyridine and oxidizing with alkali metal ferricyanide by the procedure of U.S. Patent 1,941,312 according to the following equations:

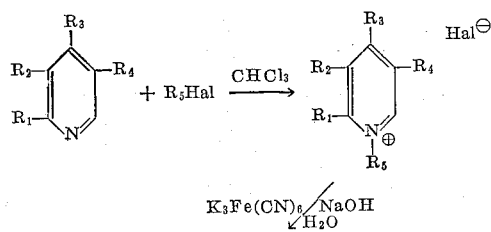

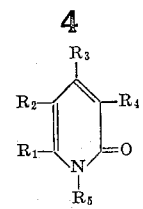

wherein Hal and $R_1$, $R_2$, $R_3$, $R_4$, and $R_5$ are as given above. Another procedure that can be used is that of Bradlow and Vanderwerf [J. Org. Chem., 16, 73 (1951)] according to the following equations:

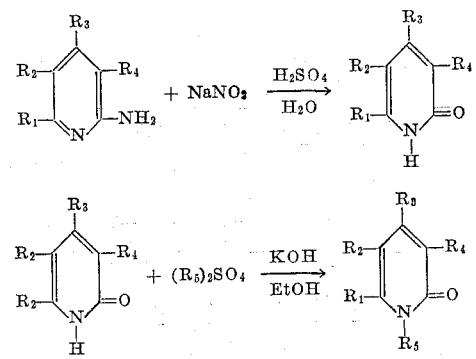

wherein $R_1$, $R_2$, $R_3$, $R_4$, and $R_5$ are as given above.

The invention can now be more fully understood by reference to the following examples which are given by way of illustration and in which parts and percentages are by weight unless otherwise specified.

EXAMPLE

[$R_5$=2-diethylaminoethyl]

(A) *1-(2-diethylaminoethyl)pyridinium chloride hydrochloride*

This substance was prepared by the method of K. Miescher and E. Urech, U.S. Patent 1,941,312 (Dec. 26, 1933) and was obtained as a hygroscopic white solid (from ethanol), M.P. 221–223° (gas evol.).

(B) *1-(2-diethylaminoethyl)-2(1H)-pyridone*

A solution of 241.5 g. (0.962 mole) of 1-(2-diethylaminoethyl)pyridinium chloride hydrochloride of Part A in 300 ml. of water was treated with 500 ml. of benzene. To this rapidly stirred mixture cooled in an ice-methanol bath was added concomitantly a solution of 154 g. (3.85 moles) of sodium hydroxide in 250 ml. of water and one-half of a solution of 627 g. (1.91 moles) of potassium ferricyanide in 1.5 liters of water at such a rate that the temperature did not exceed 20°. An additional liter of benzene was added, followed by the addition of the remaining ferricyanide solution. The mixture was stirred for 2 hrs. at room temperature. The benzene layer was separated and the aqueous phase was extracted with three one-liter portions of chloroform. The combined organic layers were dried, filtered and evaporated to give a tan liquid, which was distilled in vacuo to give 135 g. (72.6%) of colorless 1-(2-diethylaminoethyl)-1,2-(1H) pyridone, B.P. 100–102° (0.05–0.075 mm.), $n_D^{25}$ 1.5232. Vapor phase chromatography indicated that this material was about 98% pure.

(C) *3,7-bis(2-diethylaminoethyl)-3,7-diazatricyclo [4.2.2.2$^{2,5}$]dodeca-9,11-diene-4,8-dione*

A solution of 48.6 g. (0.25 mole) of 1-(2-diethylaminoethyl)-2(1H)-pyridone of Part B in 300 ml. of water was irradiated for 16 hrs. at 25° with a 200 watt unfiltered mercury vapor ultraviolet lamp. The precipitated white solid was filtered and dried to afford 5.7 g. (11.7%) of dimer, 3,7-bis(2-diethylaminoethyl) - 3,7 - diazatricyclo [4.2.2.2$^{2,5}$]dodeca-9,11-diene-4,8-dione M.P. 194–195°. This material was recrystallized from benzene-hexane to produce pure product, M.P. 196–197°.

*Analysis.*—Calcd. for $C_{22}H_{36}N_4O_2$: C, 68.00; H, 9.34; N, 14.42. Found: C, 68.00; H, 9.21; N, 14.20. M.W. Calcd. 388; Found: 377.

In tests for pharmacodynamic activity this compound displayed antiinflammatory activity and anti-pseudocholinesterase activity.

(D) [(4,8 - dioxo - 3,7 - diazatricyclo[4.2.2.2$^{2,5}$]dodeca-9,11 - diene - 3,7 - diyl)diethylene]bis[diethylmethylammonium]iodide To a solution of 3.0 g. (7.73 mmoles) of the dimer of Part C in 30 ml. of ethanol was added 15 ml. of methyl iodide and the solution was refluxed for 1 hr. A solid rapidly separated as the reaction proceeded. The cooled mixture was treated with ether, the white solid was filtered and washed thoroughly with ether. The dried product weighed 5.17 g. (99.8%); M.P. 235–236°. Pure compound was obtained as fine white crystals from 80% aqueous ethanol-ether, M.P. 235–236°.

*Analysis.*—Calcd. for $C_{24}H_{42}I_2N_4O_2$: C, 42.86; H, 6.30; N, 8.33. Found: C, 42.73; H, 6.40; N, 8.19.

In tests for pharmacodynamic activity in mice this compound displayed sedative activity.

(E) *3,7-bis(2-diethylaminoethyl)-3,7-diazatricyclo [4.2.2.2$^{2,5}$]dodecane-4,8-dione*

A solution of 5.5 g. (0.0141 mole) of the dimer of Part C in 150 ml. of absolute ethanol containing 250 mg. of platinum oxide was hydrogenated in a Parr apparatus. Hydrogen uptake was complete after 0.5 hr. (102% of theory). The catalyst was filtered, the filtrate evaporated under reduced pressure and the residue thoroughly dried. There was obtained 5.5 g. (100%) of 3,7 - bis(2-diethylaminoethyl)-3,7-diazatricyclo[4.2.2.2$^{2,5}$] dodecane - 4,8 - dione, M.P. 181–184°. The analytical sample was produced by recrystallization of this material from benzene-hexane, shiny white platelets, M.P. 183–184.5°.

*Analysis.*—Calcd. for $C_{22}H_{40}N_4O_2$: C, 67.30; H, 10.27; N, 14.27. Found: C, 67.29; H, 10.10; N, 14.12.

In tests for pharmacodynamic activity in mice, this compound displayed antipseudocholinesterase activity.

(F) *[4,8-dioxo-3,7-diazatricyclo[4.2.2.2$^{2,5}$]dodecane-3,7-diyl)diethylene]bis-[diethylmethylammonium]iodide*

A solution of 3.0 g. (7.73 mmoles) of the tetrahydrodimer of Part E in 30 ml. of absolute ethanol was treated with methyl iodide (15 ml.) as above. There was obtained 5.15 g. (99.2%) of an off-white solid, M.P. 268° (foaming). Recrystallization of this material from 90% aqueous ethanol-ether gave pure diiodide as small off-white crystals, M.P. 268° (foaming).

*Analysis.*—Calcd. for $C_{24}H_{46}I_2N_4O_2$: C, 42.61; H, 6.85; N, 8.28. Found: C, 42.44; H, 6.88; N, 7.93.

In tests for pharmacodynamic activity in mice, this compound displayed antipseudocholinesterase activity and antiinflammatory activity.

(G) *3,7-bis(2-diethylaminoethyl)-3,7-diazatricyclo [4.2.2.2$^{2,5}$]dodecane tetrahydrochloride*

A solution of 6.4 g. (0.0163 mole) of the tetrahydrodimer of Part E in 75 ml. of dry, purified tetrahydrofuran was added drop-wise to a slurry of 1.90 g. (0.050 mole) of lithium aluminum hydride in 50 ml. of the same solvent. The stirred mixture was refluxed for 2 hrs. and was decomposed while cooled in an ice-water bath with 2 ml. of water, 6 ml. of 30% sodium hydroxide solution and 2 ml. of water, in that order. The precipitated salts were filtered and washed well with ether. The filtrates were combined and evaporated to give a colorless oil which was directly converted to its tetrahydrochloride with ethereal hydrogen chloride. The white solid was filtered, and thoroughly dried to give 8.25 g. (99.0%) of 3,7-bis(2-diethylaminoethyl) - 3,7 - diazatricyclo[4.2.2.2$^{2,5}$]dodecane tetrahydrochloride, M.P. 268–270° (dec.). Pure tetrahydrochloride was obtained as fine white crystals M.P. 274° (dec.).

*Analysis.*—Calcd. for $C_{22}H_{48}Cl_4N_4$: C, 51.76; H, 9.48; N, 10.98. Found: C, 51.69; H, 9.48; N, 10.92. Equiv. wt. Calcd. 127.6; Found: 128.5.

In tests for pharmacodynamic activity in mice, this compound displayed CNS stimulant activity, antiinflammatory activity, antiappetite activity, and cholesterol-lowering activity.

By substituting the 2-diethylaminoethyl chloride in the above example by the appropriate $R_5Cl.HCl$, for example, where $R_5$ is dimethylaminomethyl,
2-dimethylaminoethyl,
1-dimethylaminoethyl,
1-methyl-2-dimethylaminoethyl,
2-dimethylaminopropyl,
3-dimethylaminopropyl,
4-dimethylaminobutyl,
1-methyl-1,3-dimethylaminopropyl,
2-methyl-3-dimethylaminopropyl,
3-dimethylaminobutyl,
5-dimethylaminopentyl,
6-dimethylaminohexyl,
diisopropylaminomethyl,
2-diisopropylaminoethyl,
2-(N-methyl-N-isopropylamino)ethyl,
2-piperidinoethyl,
2-morpholinoethyl,
2-thiamorpholinoethyl,
2-piperazinoethyl,
2-pyrrolidinoethyl,
2-hexamethyleneiminoethyl,
2-heptamethyleneiminoethyl,
2-octamethyleneiminoethyl,
2-homomorpholinoethyl,
2-(2-methylhexamethyleneimino)ethyl,
2-(2,2-dibutylhexamethyleneimino)ethyl,
2-(3,6-dimethylhexamethyleneimino)ethyl,
2-(2-ethylmorpholino)ethyl,
2-(2-ethyl-5-methylmorpholino)ethyl,
2-(3,3-dimethylmorpholino)ethyl,
2-(3-methylthiamorpholino)ethyl,
2-(2,3,5,6-tetramethylthiamorpholino)ethyl,
2-(2,3,6-trimethylthiamorpholino)ethyl,
2-(4-butylpiperazino)ethyl,
2-(4-isopropylpiperazino)ethyl,
2-(2,2,4,5,5-pentamethylpiperazino)ethyl,
2-(2,5-diisobutylpiperazino)ethyl,
2-(2,4,5-trimethylpiperazino)ethyl,
2-(2-methylpiperidino)ethyl,
2-(3-methylpiperidino)ethyl,
2-(4-methylpiperidino)ethyl,
2-(2-butylpiperidino)ethyl,
2-(2-propylpiperidino)ethyl,
2-(4-isopropylpiperidino)ethyl,
2-(3,4-diethylpiperidino)ethyl,
2-(2-sec-butylpyrrolidino)ethyl,
2-(2,2-dimethylpyrrolidino)ethyl,
2-(2-ethylpyrrolidino)ethyl,
2-(2,4-dimethylpyrrolidino)ethyl,
2-(2-isopropylpyrrolidino)ethyl and
2-(hexahydro-3-isopropylpyrimidino)ethyl, there are obtained the corresponding 3,7-bis($R_5$)-3,7-diazatricyclo[4.2.2.2$^{2,5}$]dodeca-9,11-diene-4,8-diones,
3,7-bis($R_5$)-3,7-diazatricyclo[4.2.2.2$^{2,5}$]dodecane-4,8-diones, and
3,7-bis($R_5$)-3,7-diazatricyclo[4.2.2.2$^{2,5}$]dodecanes.

By substituting the 2-pyridone in the above example by other pyridones of the formula:

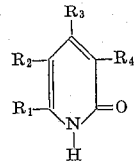

for example, wherein $R_1$ is methyl or ethyl and $R_2$, $R_3$, and $R_4$ are hydrogen; $R_2$ is methyl or ethyl, and $R_1$, $R_3$, and $R_4$ are hydrogen; $R_3$ is methyl or ethyl and $R_1$, $R_2$, and $R_4$ are hydrogen; $R_4$ is methyl or ethyl and $R_1$, $R_2$, and $R_3$ are hydrogen; or where $R_1$, $R_2$, $R_3$, and $R_4$ are methyl or ethyl, the corresponding 3,7-bis($R_5$)-2,6-di($R_8$)-;
3,7-bis($R_5$)-10,12-di($R_8$)-;
3,7-bis($R_5$)-9,11-di($R_8$)-;
3,7-bis($R_5$)-1,5-di($R_8$)-; and
3,7-bis($R_5$)-1,2,5,6,9,10,11,12-octa($R_8$)-3,7-diazatricyclo[4.2.2.2$^{2,5}$]dodeca-9,11-diene-4,8-diones;

dodecane-4,8-diones, and dodecanes wherein $R_5$ is diethylaminoethyl or any of the other aminoalkyl groups ($—C_nH_{2n}NR_6R_7$) and $R_8$ listed above is methyl or ethyl.

All of the above compounds, except those having methyl or ethyl substituents in the two and six positions have point symmetry.

I claim:
1. A compound of the formula

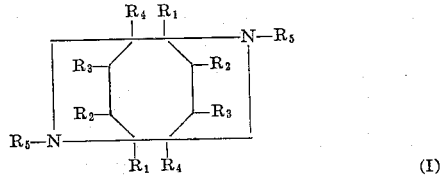

wherein $R_1$, $R_2$, $R_3$, and $R_4$ are hydrogen, methyl, or ethyl; and $R_5$ is diloweralkylamino, piperidino, morpholino, thiamorpholino, piperazino, pyrrolidino, hexamethyleneimino, heptamethyleneimino, octamethyleneimino, homomorpholino, 2-methylhexamethyleneimino, 2,2-dibutylhexamethyleneimino, 3,6-dimethylhexamethyleneimino, 2-ethylmorpholino, 2-ethyl-5-methylmorpholino, 3,3-dimethylmorpholino, 3-methylthiamorpholino, 2,3,5,6-tetramethylthiamorpholino, 2,3,6-trimethylthiamorpholino, 4-butylpiperazino, 4-isopropylpiperazino, 2,2,4,5,5-pentamethylpiperazino, 2,5-diisobutylpiperazino, 2,4,5-trimethylpiperazino, 2-methylpiperidino, 3-methylpiperidino, 4-methylpiperidino, 2-butylpiperidino, 2-propylpiperidino, 4-isopropylpiperidino, 3,4-diethylpiperidino, 2-sec-butylpyrrolidino, 2,2-dimethylpyrrolidino, 2-ethylpyrrolidino, 2,4-dimethylpyrrolidino, 2-isopropylpyrrolidino, or hexahydro-3-isopropylpyrimindo.

2. 3,7-bis(2-diethylaminoethyl)-3,7-diazatricyclo[4.2.2.2$^{2,5}$]dodecane tetrahydrochloride.

References Cited by the Examiner
UNITED STATES PATENTS

| | | | |
|---|---|---|---|
| 2,800,484 | 7/1957 | Stoll et al. | 260—294.7 |
| 2,991,288 | 7/1961 | Farstorp et al. | 260—293 |
| 3,078,272 | 2/1963 | Mull | 260—293 |
| 3,118,900 | 1/1964 | Zangg et al. | 260—294.7 |

OTHER REFERENCES

Slomp et al.: Jour. Am. Chem. Soc., vol. 83, pp. 4472–4 November 1961).

Paquette et al.: J. Am. Chem. Soc., vol. 85, pp. 765–769 (1963).

Petkovis: Lithium Aluminum Hydride in Organic Chemistry, Monograph of The Serbian Academy of Sciences (1955). (See pages 17–18 and 77–78 in particular.)

Ayer et al.: Tetrahedron Letters No. 11, pp. 648–753, 1961.

Taylor et al.: Tetrahedron Letters No. 25, pp. 1–3, (December 1960).

WALTER A. MODANCE, *Primary Examiner.*

R. L. PRICE, A. D. SPEVACK, *Assistant Examiners.*